March 7, 1933.   W. O. SNELLING   1,900,137
FOUNDRY FLASK
Filed Sept. 24, 1931
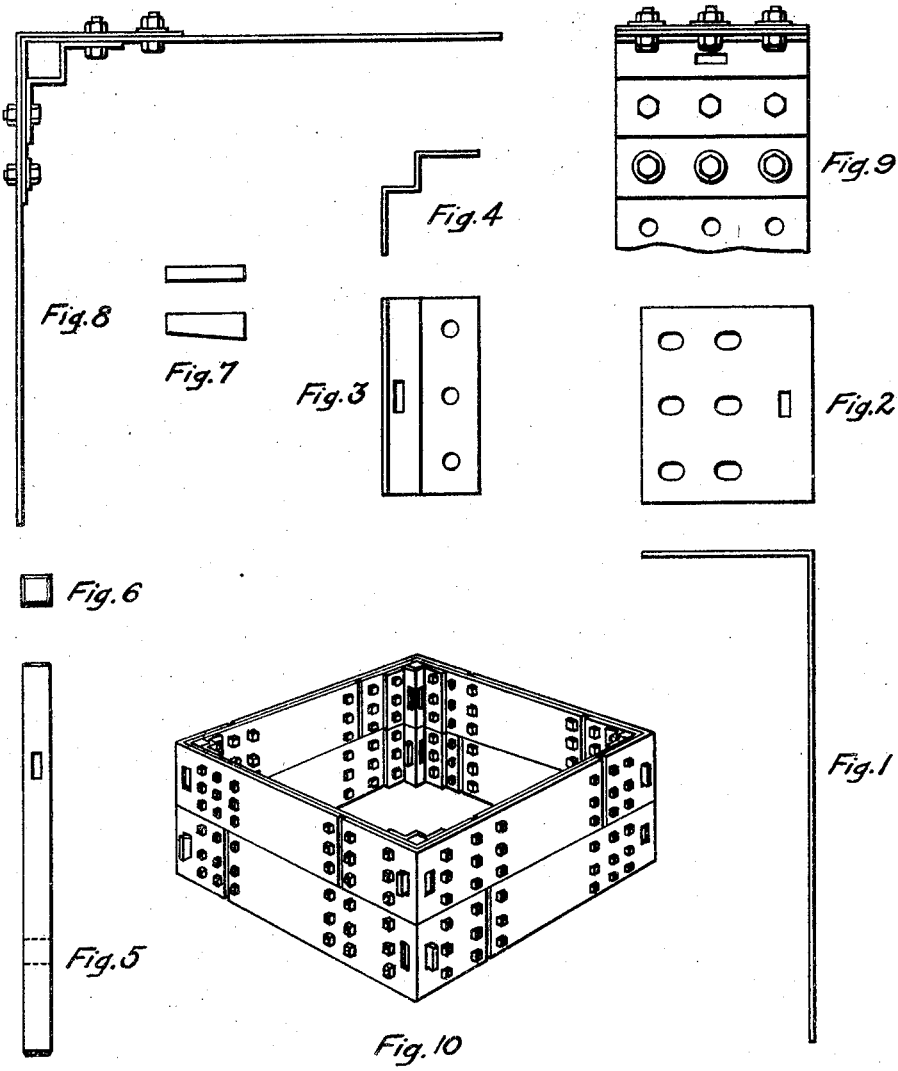
Walter O. Snelling.
INVENTOR

UNITED STATES PATENT OFFICE

WALTER O. SNELLING, OF ALLENTOWN, PENNSYLVANIA

FOUNDRY FLASK

Application filed September 24, 1931. Serial No. 564,838.

My invention relates to improvements in foundry flasks and more particularly relates to improvements in the manufacture of molding flasks built up from simple frame elements. One object of my invention is to provide a molding flask which can be assembled from a plurality of structural elements of simple form, and that when not in use can be dis-assembled or "broken down" into its constituent structural units, so as to permit of convenient storage.

I am aware that molding flasks composed largely or wholly of sheet metal are not new. My invention relates primarily to the forming of a molding flask by fastening together by means of bolts or other suitable means, of a series of L-shaped members of such nature that four of these composite L-shaped members may be fastened together to form a flask section possessing exceptional rigidity, and differing in this respect from any previous foundry flask built up of structural elements. As each of my L-shaped members may be made of two simple L-shaped members of identical size and shape, it will be evident that a complete flask section made in accordance with my present invention may be built up from eight simple L-shaped members all identical in size and shape. It is this element of my present invention which gives to it its usefulness and commerical value, as it enables foundry flasks to be rapidly built up when needed, from a stock pile of simple L-shaped members, and when no longer needed these foundry flask sections may be quickly dis-assembled into a compact and readily-stored series of simple L-shaped members. To anyone familiar with the large "yards" required by most foundries for the storage of foundry flasks of the present type, the advantage of my invention will be apparent, in the possibility that it offers of the storage of dis-assembled flask elements in very compact form, thus permitting their storage in buildings under cover, and avoiding the excessive loss of space required for the storage of flasks of the older type.

In the drawing forming a part of this specification Figure 1 is a plan view of a simple L-shaped member made in accordance with my present invention, and Figure 2 is an end view of the same. Figure 3 is an elevation of a locking member such as I may use in conjunction with the simple L-shaped members made in accordance with my present invention, and Figure 4 is a plan view of this locking member. Figure 5 is an elevation of a type of pin that I may use in conjunction with my present invention, Figure 6 being a plan view of the same. Figure 7 represents a wedge such as I may use in conjunction with my pin 5.

Figure 8 is a plan view of my composite L-shaped member. As will be noted, this composite L-shaped member is made up of two simple L-shaped members as shown in Figure 1, and one locking member as shown in Figures 3 and 4, fastened together by means of bolts. Figure 9 is a view in elevation of a portion of the composite L-shaped member. Figure 10 is an assembly, in perspective, of two of my improved flask sections, tied together by section tie pins and wedge pins.

One of the features of my invention is the overlapping of the portions of single thickness of each of the four composite L-shaped members. It will be noted that each of the composite L-shaped members is made of two identical simple L-shaped members which when assembled leave a portion of the composite L-shaped member of double thickness, and a portion of each leg of single thickness. In the complete assembly of a unit section, the single thickness portions of each of the composite L-shaped members overlap, so that all portions of the assembled section are of double thickness. This is an important feature of my present invention, and gives to my assembled flask section a rigidity which is relatively great as compared with the structural strength or rigidity of other assembled foundry flasks.

It will of course be evident that handles may if desired be bolted or otherwise fastened to my flask sections, to assist in the handling of same and that sand-retaining elements may be similarly bolted or otherwise attached to either the assembled flask sections or to the separate elements thereof. My invention resides in the forming of a flask section by the fastening together of four identical L-shaped flask section frame elements, and I do not claim as any part of my invention the particular means employed to tie together a plurality of such flask sections, or of any accessory parts of such flask section frames such as handles, sand-retaining elements or the like.

In its simplest form my invention comprises a foundry flask frame composed of four identical L-shaped flask section frame elements fastened together with portions of each of the frame elements overlapping a similar portion of each of two adjacent frame elements. I have discovered that this particular novel construction offers greater advantages in both manufacture and use, and enables a thoroughly practical foundry flask to be rapidly constructed from stock elements, and to be rapidly dis-assembled when not in use. I do not claim as any portion of my invention a foundry flask frame composed of four I-shaped or straight sides, as I have found that foundry flasks so constructed cannot be given the degree of structural rigidity which is necessary to enable them to withstand the rough handling to which a foundry flask is subjected under the conditions of practical use.

Although I prefer to use composite L-shaped sections formed from sheet metal, I do not wish to be strictly limited to such construction, as under certain conditions I may satisfactorily employ a square or oblong frame made up solely of simple L-shaped sections as shown in Figure 1, the end portions of two such L-shaped members being bolted together to form the central portion of one side of the frame, without the use of double reinforcement at the corners of the frame, and under some conditions I may similarly employ L-shaped castings of a metal possessing suitable mechanical characteristics instead of L-shaped members made wholly from rolled or sheet metal, although in general I find that the best results are obtained from the use of composite L-shaped sections made of relatively thin sheet metal.

In one form of my invention I find it desirable to employ rivets instead of nuts and bolts as a means of fastening together portions of my assembled device, and if desired these rivets may be made of a metal more fusible than the sheet metal of which the L-shaped members are composed, this particular construction offering means for the rapid dis-assembling or "breaking down" of my mold assembly when this is desired. Thus, for example, by constructing my L-shaped members of mild steel, and employing rivets of brass or other alloy having a fusing point lower than the softening point of mild steel, as a means of fastening together the L-shaped steel members, I obtain a mold assembly which may be "broken down" readily and quickly by means of the heat from a blow torch. Instead of rivets of brass or other metal or alloy of still lower fusibility I may employ rivets of a relatively soft metal, such as copper, lead or aluminum or any soft alloy, in this case the mold assemblies being broken down by the use of a chisel when the stacking of the constituent parts is desired.

Although in the practice of my present invention I prefer to employ four identical L-shaped members having legs of equal length in the construction of each of my flask sections (this giving a flask section having the form of a square) my invention may also be applied to the construction of flask sections of rectangular shape other than square. This may be accomplished either by employing four identical L-shaped members having legs of unequal length, or by employing two sets of L-shaped members each set consisting of two identical L-shaped members, these two sets of L-shaped members differing in the length of one of the legs of each set, or as an alternative form of construction a flask section may be built up by employing four identical L-shaped members, with suitable lengths of flat sheet metal used to lengthen two of the sides of the square that would normally be formed by these four L-shaped members when assembled. By the use of four identical L-shaped members and lengths of auxiliary sheet metal pieces to form sides, it is possible to build up a great variety of sizes and shapes of foundry flasks in accordance with my present invention.

The word "identical" as used throughout this specification and in the claims is intended to mean that the four members used in forming any particular foundry flask section are alike and similar in form and shape with respect to all of their functional characteristics. It is not intended, however, that the word "identical" as herein used should be construed as having so narrow a meaning as to include minor or incidental modifications having no functional significance or intended merely to differentiate the individual L-shaped members. Thus, for example, markings upon the individual L-shaped members such as might distinguish the year in which they were made or sold is not to be considered as establishing a difference between such L-shaped members, and similarly L-shaped members are to be considered as identical when they differ only from each other in such ways as do not in any way modify their utility or similarity in connection with their use in accordance with the invention as herein described.

As it will be evident that many modifications may be made in the application of my invention without departing from the principles as herein disclosed, no limitations should be made upon my invention except such as are indicated in the appended claims.

I claim:

1. A foundry flask section comprising four structurally rigid composite L-shaped members each having a central L-shaped portion of double thickness and two legs each of single thickness, assembled so that the portions of single thickness overlap to form a frame of substantially double thickness throughout its entire periphery.

2. A foundry flask section comprising four identical composite L-shaped members each having a central L-shaped portion of double thickness and two legs of single thickness, assembled so that the portions of single thickness overlap to form a frame of substantially double thickness throughout its entire periphery.

3. A foundry flask section consisting of a rigid metal frame having four sides and four right-angled corners, this frame consisting of four rigid overlapping L-shaped members of sheet metal, each L-shaped member forming one corner of the frame and each side of the frame consisting of overlapping integral prolongations of two of the rigid L-shaped members fastened together at their overlapping portions.

In testimony whereof, I have hereunto subscribed my name this 21st day of September 1931.

WALTER O. SNELLING.